United States Patent [19]

Maxey

[11] 4,186,310
[45] Jan. 29, 1980

[54] AUTOMATIC WANE DETECTOR

[76] Inventor: Carl W. Maxey, P.O. Box 65, Corvallis, Oreg. 97330

[21] Appl. No.: 916,596

[22] Filed: Jun. 19, 1978

[51] Int. Cl.² ............................................. G01N 21/30
[52] U.S. Cl. ...................................... 250/561; 144/312
[58] Field of Search ................ 144/312, 313; 250/560, 250/561, 559, 571, 223; 356/384, 385, 386, 387

[56] References Cited

U.S. PATENT DOCUMENTS

| | | |
|---|---|---|
| 946,457 | 1/1910 | Miles. |
| 1,824,381 | 9/1931 | Sorensen et al. |
| 2,181,398 | 11/1939 | Firestone. |
| 3,063,479 | 11/1962 | Prentice. |
| 3,329,181 | 7/1967 | Buss et al. |
| 3,562,538 | 2/1971 | Mergler. |
| 3,811,487 | 5/1974 | Warren et al. |
| 3,886,372 | 5/1975 | Sanglert. |
| 3,890,509 | 6/1975 | Maxey. |
| 3,890,862 | 6/1975 | Lhenry. |
| 3,942,000 | 3/1976 | Dieringer. |
| 3,986,774 | 10/1976 | Lowrey et al. |
| 4,086,496 | 4/1978 | Berry .................................. 144/312 |

*Primary Examiner*—David C. Nelms
*Attorney, Agent, or Firm*—Klarquist, Sparkman, Campbell, Leigh, Hall & Whinston

[57] ABSTRACT

Plural scanners are employed for detecting the surface features of a wood cant preparatory to sawing the cant into one or more boards. A scanner includes a radiation detector disposed above the cant on the wane side thereof, and a radiation source below the cant whereby the edges of the cant may be detected. A further pair of radiation sources are also located above the cant on the wane side thereof in angular relation to the detector for producing radiation beams which intersect the detection path of the detector only at a surface level corresponding to a predetermined acceptable wood thickness, as distinguished from the forward and rearward wanes. The wanes are detected as the region between detector illumination by the source below the cant, and detector illumination from the pair of sources above the cant.

32 Claims, 14 Drawing Figures

AUTOMATIC WANE DETECTOR

BACKGROUND OF THE INVENTION

The present invention relates to a wane detector and particularly to such a detector for measuring the forward and rearward wanes on a cant and the acceptable wood portion therebetween.

The wane of a plank or cant is the rounded or non-squared edge resulting when such plank or cant is sawn from a round log. The wane is removed, within certain tolerance restrictions, before the plank or cant is further processed into dimensioned lumber. Of course, the wane can be sawn from the cant after visual inspection or measurement by operating personnel, but this can be unnecessarily time consuming. Merely trimming all cants within certain dimensions to remove all wane areas would be wasteful and uneconomic.

Automatic wane detectors as heretofore proposed have been relatively expensive and require sufficient space for mounting light sources or radiation sources at remote or separated points in order to cast a shadow on the respective wanes and measure the acceptable width area therebetween. Not only are some of these detectors inclined to be expensive and cumbersome, but they can also be subject to inaccuracies due to the diverse location and possible relative movement of detecting elements.

SUMMARY OF THE INVENTION

According to the present invention, a scanner for detecting the position and lateral extent of acceptable wood surface of a cant as distinguished from wane at the edges of the cant comprises a detector positioned on the wane side of the cant and a radiation source on the opposite side for determining the presence of the cant therebetween. At least one other radiation source is positioned on the same side of the cant as the detector and directs radiation toward the acceptable wood surface of the cant at an angle to said surface, intersecting the said surface for operating said detector when said surface is at a predetermined level. Preferably, a pair of second sources are utilized for directing radiation in two angular directions toward a plane of intersection corresponding to the predetermined acceptable wood surface of the cant. The detector supplies information as to the edges of each wane, and the extent of the acceptable wood surface between the wanes. Moreover, the apparatus is relatively compact, taking up comparatively little space, and is relatively inexpensive. Since the major portions of the present apparatus are in relatively proximate relation, they may be mounted together resulting in a more satisfactory and more accurate output for a longer period of time.

It is accordingly an object of the present invention to provide an improved wane detector or scanner for measuring the wane portion of a wood cant.

It is another object of the present invention to provide an improved wane detector or scanner for producing more accurate output information.

It is a further object of the present invention to provide an improved scanning device for detecting an acceptable wood surface of a cant and the wane at the edge thereof, which device is compact and economical in construction and accurate in operation.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DETAILED DESCRIPTION

Figure 1:
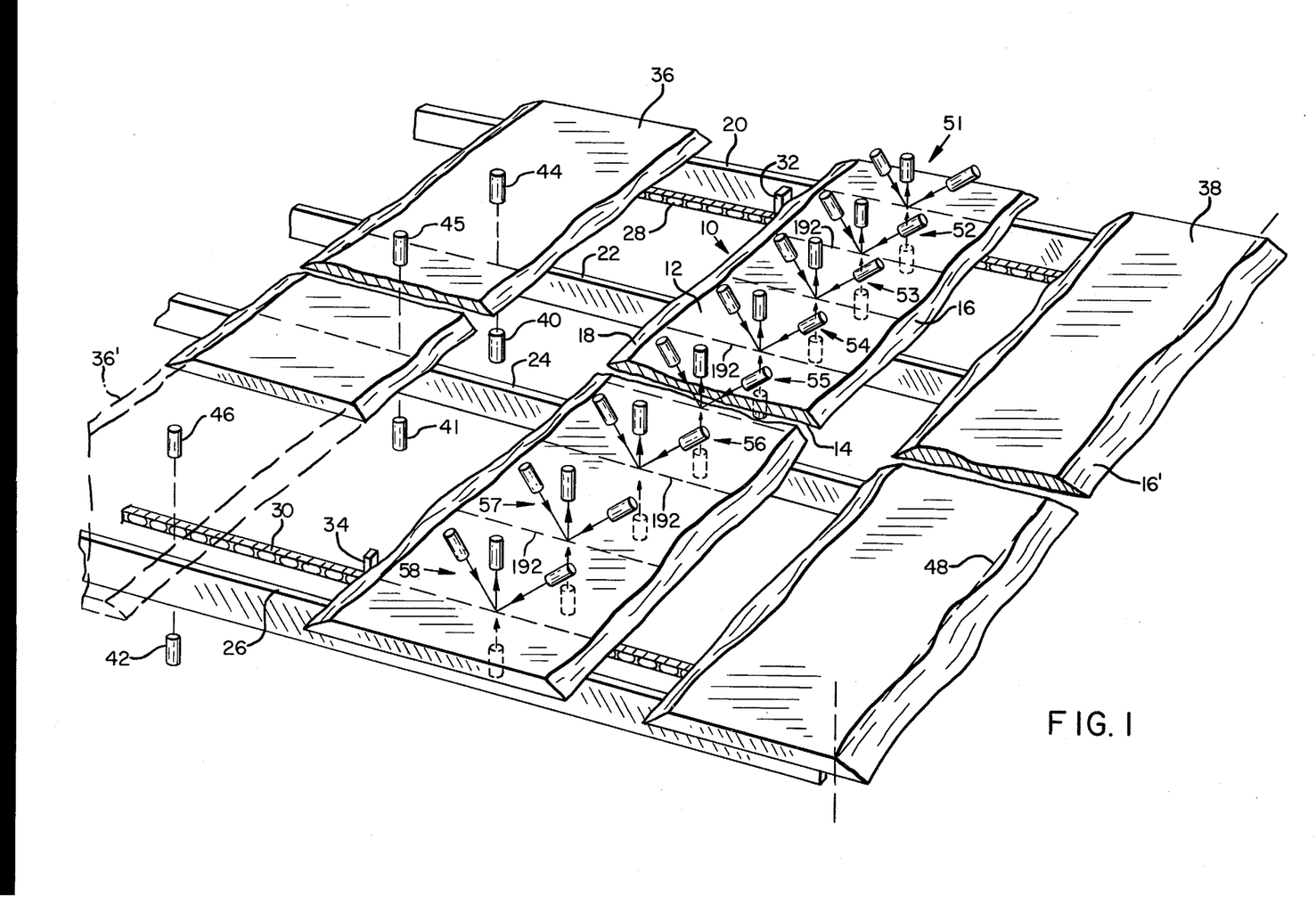
FIG. 1 is a perspective view of a portion of a sawmill illustrating the positioning of wane detectors or scanners according to the present invention.

Referring to the drawings and particularly FIG. 1, a cant sawn from a round log has a substantially uniform thickness between upper surface 12 and lower surface 14, but is characterized by sloping or beveled forward and rearward edges, 16 and 18 respectively. The forward and rearward edges or wanes correspond to the outer periphery of the log from which the cant is obtained. The cant is disposed with its wanes facing upwardly upon a conveying system comprising rails 20, 22, 24 and 26 upon which it is moved forwardly to the right by means of chains 28 and 30 carrying cant engaging lugs 32 and 34. Other chains are suitably disposed in between chains 28 and 30 but only two are shown for clarity of illustration. Other cants are illustrated at 36 and 38, and illustrate a previous and subsequent position of cant 10 as it moves along the conveyor system.

Cant 36, in the course of its movement to the right, interrupts light beams provided by light sources 40-42 directed toward photocells or photo-diodes 44-46 for determining the length of the cant. Cant 36 is illustrated as somewhat foreshortened and would therefore interrupt light beams from light sources 40 and 41, but not 42. Consequently, a conveyor 28 would be activated along with an intermediately positioned conveyor (not shown) for moving the cant. However, when the cant has a length as illustrated at 36', conveyors 28 and 30 will be operative. It is understood further conveyors and photoelectric detecting means will suitably be provided.

Cant 10 in FIG. 1 is scanned by an array of scanners according to the present invention, the individual scanners being numbered 51 through 58. The individual scanners are suitably disposed at one foot intervals along the cant, and are employed for determining the location and extent of the wane at the forward and rearward edge of the cant, i.e., wanes 16 and 18, as well as the available wood therebetween. One such scanner, numbered 51, will be described in greater detail with reference to FIG. 2, it being understood that each of the other scanners is substantially identical in construction and operation.

The cant 10 is scanned by the array of scanners as the cant is moved from left to right in FIG. 1. Subsequent to scanning, the cant moves to the position of cant 38, and a saw line 48 is determined which will substantially remove the forward wane, 16'. When the saw line is determined, the cant 38 may, for example, be propelled lengthwise into a saw or chipper for removing the wane 16'.

Figure 2:
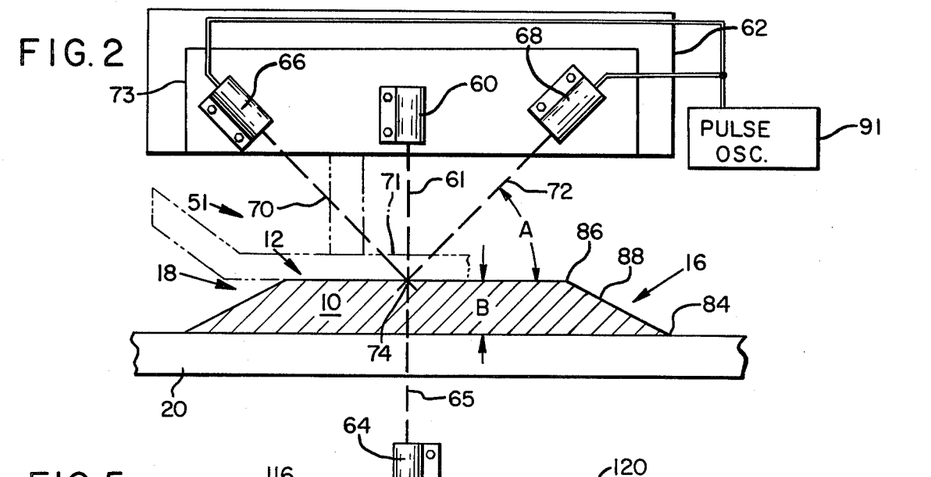
FIG. 2 is a side view of one such scanner.

Referring particularly to FIG. 2, illustrating a scanner 51 in greater detail, an electromagnetic radiation detector 60 is mounted upon a support beam 62 disposed above the conveyor system of FIG. 1 so the detector is oriented to receive radiation in a vertically upward direction. Beam 62 mounts detector 60 above the level of rail 20 and cant 10 as the latter moves from left to right through the region of scanner 51. An electromagnetic radiation source 64 is mounted, by means not shown, underneath the level of rail 20 and directs radiation 65 vertically upward in direct alignment with the detection path 61 of detector 60. Consequently, detector 60 normally receives radiation from source 64 and provides a corresponding signal output, except when a cant such as cant 10 is interposed therebetween in the manner illustrated in FIG. 2.

Second and third electromagnetic radiation sources, 66 and 68 respectively, are also mounted on beam 62 and provide narrow radiation beams 70 and 72 directed angularly downwardly, both at an angle A with respect to the horizontal top surface 12 of cant 10. Angle A is suitably 45 degrees. Source 68 is angularly forward of detector 60 and source 66 is angularly rearward thereof along the direction of conveyor travel. Both sources 66 and 68 are located so that the beams 70 and 72 intersect at a point 74 directly below detector 60 in the narrowly focused detection path thereof, so long as dimension B, the thickness of cant 12 above rail 20, has a predetermined value. Thus, if cants have been produced in a sawing operation designed to provide two-inch lumber, dimension B would be a standard two inches or the customary thickness in the trade for such lumber. If beams 70 and 72 intersect at point 74, having the distance B above rail 20, then detector 60 can respond to the radiation reflected from point 74. However, the detector will be substantially non-responsive to radiation reflection from any other cant thickness, since the beams 70 and 72 will not reach the top surface of the cant directly below detector 60 in the narrow detection path 61 thereof. It is noted that for the prescribed thickness B, the radiation from beams 70 and 72 reinforce one another or have double intensity at point 74, and result in an enhanced output from detector 60. Also, since two sources are employed, i.e. forward and behind the detector, any tendency for the cant surface to reflect radiation in a directional manner, due to roughness or rotation along its long axis, can be canceled out. Also, mechanical alignment problems are lessened in employing the wane detector configuration according to the present invention to ascertain wane measurement and wood measurement therebetween.

One or more hold down shoes 71 as illustrated in FIG. 2, may be employed for insuring cant 10 is urged downwardly against conveyor system rails, for example rail 20, to insure an accurate indication is given relative to thickness levels of the cant. In such case, the hold down shoes are fixed in relation to beam 62 and urge the cant downward as it passes thereunder. In an alternative construction, hold down shoes or the like are secured to beam structure 62, but the latter is made movable upwardly and downwardly with the shoes whereby measurements made will be relative to the top surface 12 of cant 10. In such case, the wane portions are distinguished from top surface 12 by the detector apparatus, and it is insured point 74 will always correspond to the top surface of the cant.

Figure 3:
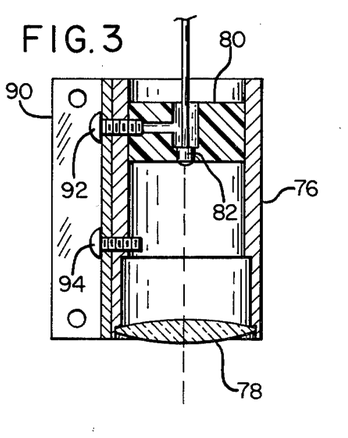
FIG. 3 is a longitudinal cross section of a radiation source or detector as employed in the scanner.

Referring to FIG. 3, a construction is illustrated which is applicable to sources 64, 66 and 68, as well as to detector 60. In each case, this construction includes a cylindrical metal shell 76 provided at its open end with a lens 78, suitably having a twenty-five millimeter diameter. Rearward of the lens within shell 76 is positioned a plexiglass support plug 80 for centrally locating a radiation device 82, which in the case of radiation sources preferably comprises an infrared emitter, and which preferably comprises an infrared sensitive photodiode in the instance of the detector. The device 82 is so located with respect to the lens 78 that a small spot or image is focused at point 74 in the case of sources 66 and 68. A one-sixteenth to one-eighth inch diameter spot is focused at point 74 on the top surface 12 of cant 10 by either source 66 or 68 in a typical case. Source 64 and detector 60 are also focused at point 74. The shell 76 is secured to an L-shaped mounting bracket 90 by means of screws 92 and 94. The mounting bracket is in turn employed to secure the structure to beam 62, or to understructure (not shown) in the case of source 64.

It will be observed that detector 60 together with sources 66 and 68 are mounted upon the same support beam 62, which results in continued accuracy of spot focusing and detector output after the devices are once mounted. In fact, the detector 60 and the sources 66, 68 are mounted on beam 62 as a unit employing a single enclosure or sub-support 73. Then, the individual units 60, 66, 68 need not be adjusted relative to one another, but only the common sub-support need be properly positioned on beam 62 such that focus point 74 will occur at the exact top surface for cants being detected. Although source 64 is mounted below the cant, and should be accurately mounted on the structure of the conveying system relative to beam 62, nevertheless it will be appreciated the positioning of source 64, producing direct illumination of detector 60, is less difficult than the accurate positioning of sources 66 and 68.

A principal purpose of scanner 51 is to ascertain the location and extent of wane, e.g. leading wane 16, at the forward edge of the cant as the cant moves from left to right. The scanner will provide information regarding the beginning of the wane defined as wood point 84 in FIG. 2, the end of wane where the wane intersects top surface 12 which will be called the acceptable wood point 86, and by proportion, an intermediate point 88 which may be termed the wane point. This will be understood to be the sawing location which would leave a small amount of wane on the resulting board, but which is nonetheless acceptable according to grading rules. Grading rules may allow, for example, a wane tolerance equaling one-third the depth of the piece. Assuming the wane is substantially flat, the wane point 88 would then be one-third of the distance from point 86 to point 84, and the component of this distance in the horizontal direction would also be a proportional one-third of the horizontal extent of the wane. Of course, the wane is somewhat rounded, but these dimensions are given by way of example.

The radiation sources are energized in a conventional manner by a source of electrical energy. However, sources 66 and 68 are pulsed. In the present example, the period of pulsation is 0.4 milliseconds provided by pulse oscillator 91 in FIG. 2. The output of detector 60, and specifically the infrared photo-diode thereof, is suitably connected to the base of an amplifying transistor 96 in FIG. 4, the emitter of the transistor being grounded and the collector thereof being returned to a source of positive voltage through resistor 98. The collector of transistor 96 is further coupled to the input of amplifier 100 via capacitor 102, and is also coupled to the input of a Schmitt trigger circuit 104. The output of amplifier 100 is applied to monostable multivibrator 106 which supplies a first output for the circuit. The output of Schmitt trigger circuit 104 is coupled via inverter 108 to provide a second output. Both such outputs are suitably coupled to a computer or saw-control 110 which directs sawing of the cant to remove or substantially remove the detected wane portion of the cant.

Operation of the scanner including the construction shown in FIG. 2 as well as the circuit of FIG. 4 will be described with respect to the explanatory diagrams of FIGS. 5 through 11. FIG. 5 comprises a waveform chart indicative of voltage levels occurring in FIG. 4 circuit in response to detection of a cant schematically illustrated at 112. It will be appreciated the orientation of a cant 112 is for waveform reference only and does not necessarily indicate the direction of passage of a cant through the scanner.

Figure 4:
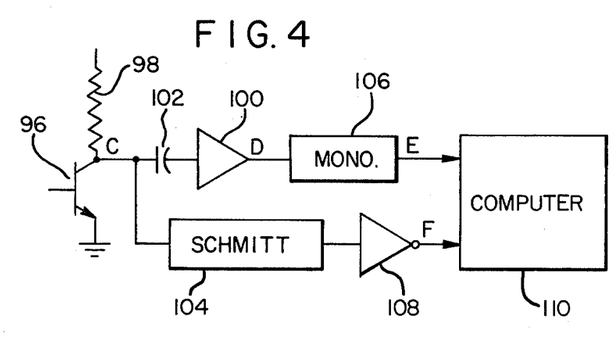
FIG. 4 is a schematic diagram of circuitry for receiving the output signal from the detector.
Figure 5:
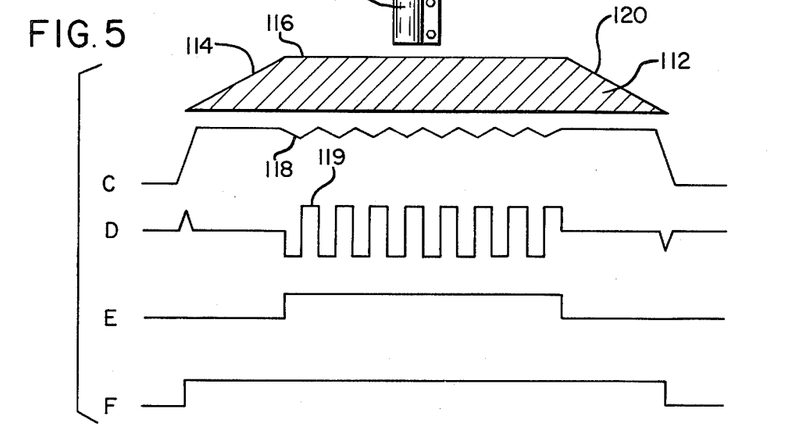
FIG. 5 is a waveform chart illustrating operation of the FIG. 4 circuit.

The waveforms present at correspondingly lettered points in the FIG. 4 circuit are illustrated in FIG. 5. The waveforms illustrate the response of the circuit as the scanner scans portions of the cant corresponding to cant 112 illustrated immediately thereabove. Each of the waveforms initially have a ground or reference level as radiation source illuminates detector 60, thereby operating Schmitt trigger circuit 104. The high output of trigger circuit 104 is inverted by inverter 108 to provide a reference level for waveform F. The threshold of operation of Schmitt trigger circuit 104 is such that an output from detector 60 indicative of direct illumination from source 64 is required to operate Schmitt trigger 104. Then, when an edge of the cant is interposed between source 64 and detector 60, the Schmitt trigger 104 is no longer operated, whereby its output goes low and the output of inverter 108 rises, producing waveform F. As the wane 114 becomes interposed between the radiation source and the detector, the output C of transistor 96 remains at a substantially high level, insufficient for operating the Schmitt trigger circuit 104. When the radiation beams from sources 66 and 68 strike the top surface 116 of cant 112, radiation is reflected into detector 60, but this radiation is an order of magnitude less than directly received radiation, and accordingly produces a relatively small variation in the output C of transistor 96. This AC waveform portion 118 results from the fact that light sources 66 and 68 are pulsed as hereinbefore mentioned. The variation is insufficient to change the status of Schmitt trigger circuit 104. However, the AC component is coupled via capacitor 102 to amplifier 100 which is driven into saturation by such waveform, producing a squared-up resultant illustrated at 119 in FIG. 5. The waveform portion 119 has the 0.4 millisecond repetition period of sources 66 and 68.

The waveform D is coupled to monostable multivibrator 106 which has an 0.5 millisecond time constant or is designed to remain in the triggered state for 0.5 milliseconds. Therefore, the faster repetition input D effectively keeps the monostable multivibrator triggered for as long as the acceptable wood surface 116 provides the AC component in the detector output. Consequently, an output pulse E is provided for monostable multivibrator 106 until the scanner encounters wane 120. At this time, waveform E drops low, but output F remains up until the edge of the cant is reached and detector 60 once more receives direct radiation for operating Schmitt trigger circuit 104. It will also be appreciated the waveform representation of FIG. 5 is by way of illustration of relative positioning, and actual waveform portions 118 and 119 have a much higher frequency than would be indicated from the drawing.

The operation of the scanner is more fully illustrated in FIGS. 8 through 11. As cant 10 in FIG. 8 interrupts beam 65 directly illuminating detector 60, waveform F rises as hereinbefore described. Then as the forward top corner or the acceptable wood point reaches a location directly in line with path 61 of detector 60 in FIG. 9, the waveform E rises. At this point, assuming cant 10 has the prescribed thickness, the radiation beams 70 and 72 intersect mutually with the detector path 61 at precisely the plane of the acceptable wood surface such that the output E is produced. The same combination of outputs continues until the cant 10 reaches the position illustrated in FIG. 10, wherein waveform E goes low as the trailing wane becomes aligned with detector path 61. Then, as the cant 10 passes out from between source 64 and detector 60 in FIG. 11, waveform F also goes low. The wanes are detected as the areas which provide waveform F without waveform E.

Figures 6, 7:
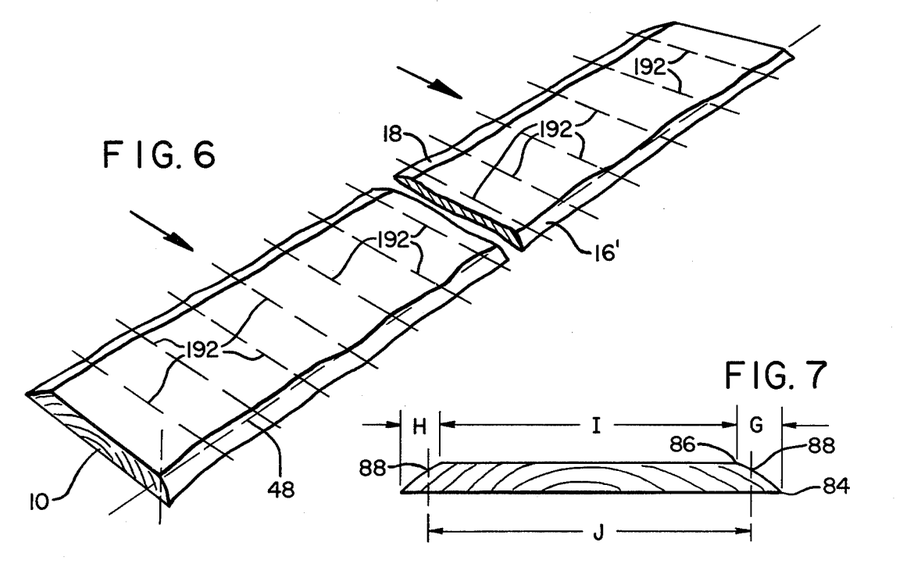
FIG. 6 illustrates scans across a cant for the purpose of removing a wane thereof.
FIG. 7 is a cross-sectional view of the FIG. 6 cant.
Figure 8:
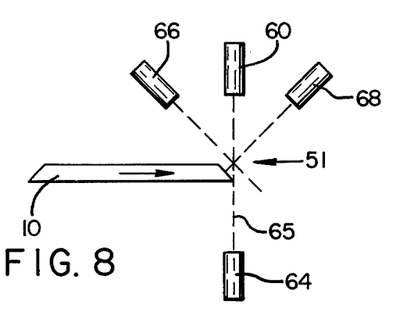
FIGS. 8 through 11 illustrate successive positions of a cant passing through a wane detector or scanner according to the present invention.
Figure 9:
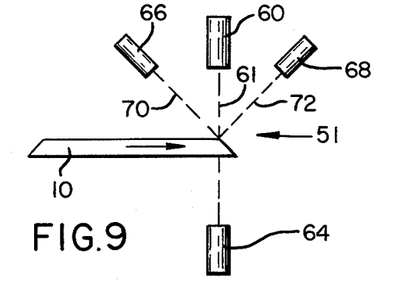
Figure 10:
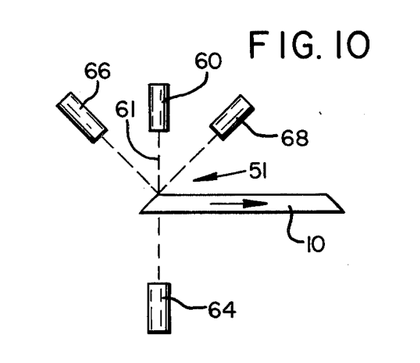
Figure 11:
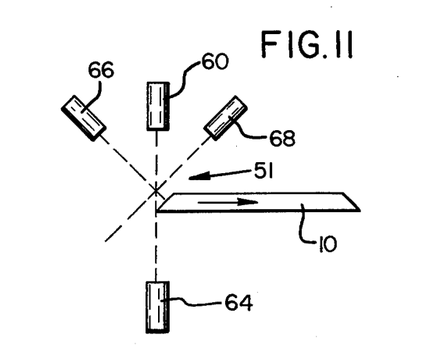

As the cant 10 moves through a plurality of scanners in the direction indicated by the arrow in FIG. 6, information is acquired as to the width of the cant and the extent of the wane on the trailing and leading edges for a plurality of scans 192 across the cant. Thus, referring to FIG. 7, for each of the scans a possible acceptable wood width I is defined with a leading wane G and a trailing wane H. Permitting allowable wane tolerance for the board, a width J may be secured between wane points 88.

Although the scanners according to the present invention could be moved relative to the cant for determining the wane location and hence the position of a saw line 48, it is more convenient to move the cant through the scanners as herein illustrated. Then, as the cant is moved further to the right to the position of cant 38 in FIG. 1, the information derived from the scanners is conveniently stored by conventional memory means in computer 110 in FIG. 4 receiving the E and F outputs of the respective scanners. Information is stored until the cant moves from under the scanners to the position of cant 38, and a saw line 48 is established. The computer is, of course, also responsive to the extent of conveyor movement or may determine the same. According to one mode of selecting the saw line, such saw line intersects the innermost or last occurring acceptable wood point. The wane would thus be severed at a point where it most deeply indents the leading edge of the cant. Alternatively, the saw line can be established at the innermost or last occurring wane point 88, as illustrated in FIG. 7, with the proportionality being established by computer 110 between the wane point and acceptable wood point for the same scan. A second saw line can also be established along which the trailing wane can be severed according to the forward-most or first occurring acceptable wood point or wane point. Therefore, a board width I or J is defined which will effectively remove the wane portions. Instead of merely severing the trailing wane in the manner described, standard width may be stored in computer 110, prescribing a saw line for the trailing edge of the board which will result in an integral number of two-by-fours, two-by-sixes, or the like.

Rather than determining the saw line from the most deeply indented acceptable wood point or wane point on the leading edge, the saw line may be made to correspond to plural acceptable wood points or wane points. Then, adjustable end stops (not shown) may be employed for arresting forward movement of the cant in a desirable angular saw line position prior to sawing.

The manners in which the final saw lines may be specifically selected or determined are given by way of illustration. The present invention is principally concerned with detecting and presenting useful output information indicative of the extent and position of the leading and trailing wanes, and the acceptable wood therebetween, which information may be utilized as an input to a saw control or computer, or which may merely be used to provide a measuring output.

Figure 12:
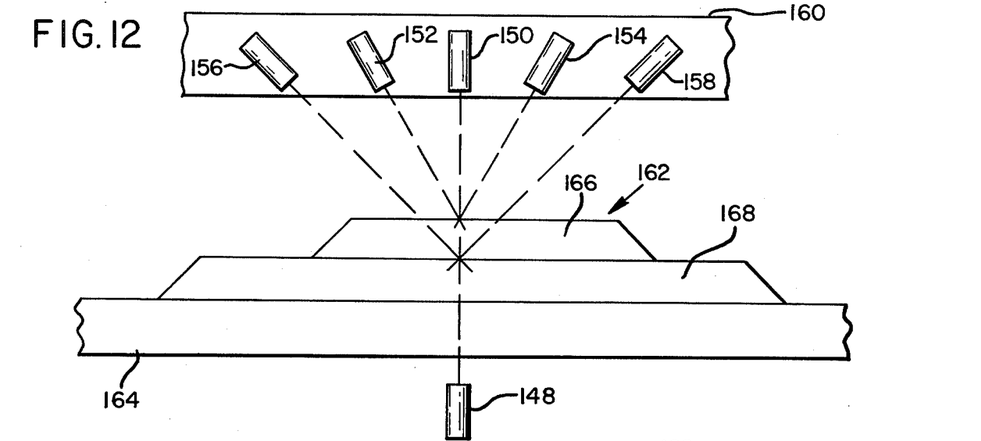
FIG. 12 is a side view of a wane detector or scanner according to a second embodiment of the present invention.

A more complex scanner according to the present invention is illustrated and explained with reference to FIGS. 12-14. This scanner, which it is understood may also be duplicated along the width of a conveyor system for measuring a cant thereunder at intervals, is employed to detect more than one cant width. For purposes of illustration, a composite member 162 is composed of an upper cant portion 166 and a lower cant portion 168 supported on rail 164. A lower radiation source 148 produces a radiation beam directed toward detector 150 secured to a beam 160 spaced above rail 164. In FIG. 12, the beam is interrupted by member 162. It is understood further rails 164 will support the cants at intervals in the manner described with respect to FIG. 1.

Further mounted upon beam 160 is a first pair of radiation sources 152 and 154 each disposed at a first angle with respect to the horizontal, rearward and forward of detector 150, for projecting narrow radiation beams which intersect one another precisely at the top surface of cant 166, exactly below the detection path of detector 150. A second pair of radiation sources 156 and 158 are also supported by beam 160 at rearward and forward positions at smaller identical angles with respect to the horizontal to produce narrow radiation beams intersecting one another at precisely the top surface of cant 168 and, again, exactly in line with the detection path of detector 150. It will be realized the beams from sources 156 and 158 will not intersect nor produce an output from the detector when cant 166 is located above cant 168 as herein illustrated.

The radiation source 148 is continuously empowered to provide a continuous level of illumination for detector 150 in the absence of a cant therebetween. The direct illumination causes detector 150 to produce a high level output. Sources 152 and 154 are pulsed electrically at a first repetition rate to produce pulsed or flashing radiation emission, while sources 156 and 158 are pulsed electrically at a second repetition rate to produce a second repeated or flashing radiation. In the illustrated embodiment, the sources 152 and 154 are pulsed to have a period of 0.5 milliseconds, while sources 156 and 158 are pulsed at a period of 0.9 milliseconds. Pulsing is accomplished by empowering the sources by means of pulse oscillators (not shown) in the same manner as illustrated in FIG. 2 by pulse oscillator 91. As discussed with respect to the previous embodiment, the reflected radiation provides an order of magnitude lower illumination for detector 150. However, the pulsed emission produces an AC output which can be detected. Also as in the previous embodiment, the narrow beams from sources 152 and 154 converge to produce a detected output only for a desired surface level or acceptable wood level for the top cant. Similarly, the narrow beams from sources 156 and 158 converge only for a predetermined thickness of cant 168 above rail 164, assuming the absence of cant 162, resulting in illumination of detector 150 for substantially only the prescribed thickness. The utilization of sources both forward and behind the detector results in relatively uniform output despite some roughness in the cant surface, etc.

Figure 13:
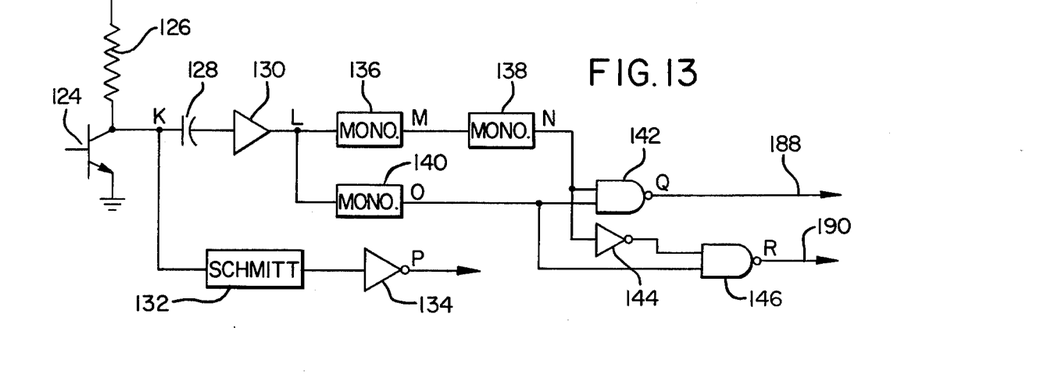
FIG. 13 is a schematic diagram of a circuit for receiving the detector output from the FIG. 12 scanner.

Referring to FIG. 13, the output of detector 150 is applied to the base of transistor 124, the emitter of which is grounded, and the collector of which is returned to a positive voltage through resistor 126. The collector is also connected to an input of Schmitt trigger circuit 132 having its output applied to inverter 134. The collector of transistor 124 is further coupled through capacitor 128 to the input of amplifier 130. Amplifier 130 drives monostable multivibrators 136 and 140, wherein monostable multivibrator 136 further drives the monostable multivibrator 138. The outputs of monostable multivibrators 138 and 140 are applied to NAND gate 142 to produce an output on lead 188. In addition, the output of monostable multivibrator 140 is applied as one input of NAND gate 146, while the output of monostable multivibrator 138, inverted by inverter 144, is applied as a second input to NAND gate 146, the latter providing an output on lead 190. The time constant of multivibrator 136 is suitably 0.6 milliseconds, while the time constant of both multivibrators 138 and 140 is suitably one millisecond.

Figure 14:
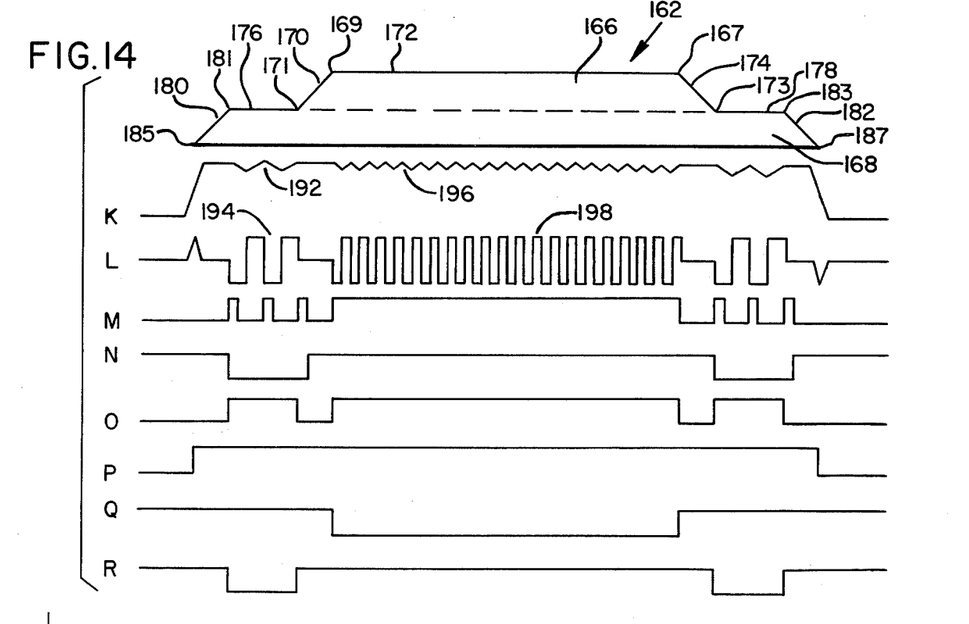
FIG. 14 is a waveform chart illustrative of the operation of the FIG. 13 circuit.

It will be understood the illustration of composite member 162 in FIG. 14 is for the purpose of showing waveforms generated in correspondence to portions of the member 162 giving rise to those waveforms, and FIG. 14 is not necessarily illustrative of the direction of movement of the member 162 relative to a scanner.

Referring to the operation of the FIGS. 12-13 device in conjunction with the FIG. 14 waveform chart, when cant 168 interrupts the direct radiation beam from source 148 to the detector, e.g. at point 185 in FIG. 14, the output K at the collector of transistor 124 rises sharply. As a consequence, Schmitt trigger 132 through inverter 134 produces a positive going output P indicative of a presence of the cant. The output P stays high as long as the beam from source 148 is interrupted. No other output is produced, relative to wane 180, until point 181 is reached at which time the beams from sources 156 and 158 converge at surface 176. The combined reflected signal is detected by detector 150, and since the beam from sources 156 and 158 is pulsed with a signal having a 0.9 millisecond period, an AC waveform 192 having a similar period is present at K for coupling through capacitor 128 to amplifier 130. Although the reflected signal is an order of magnitude smaller than the signal resulting from direct radiation, this AC signal nevertheless drives amplifier 130 to saturation, resulting in waveform L having the 0.9 millisecond period as illustrated at 194. Since the time constant of monostable multivibrator 140 is one millisecond, the 0.9 millisecond period pulses cause the output of monostable multivibrator 140 to remain high as illustrated at O. Multivibrator 136 is not held on continuously because its time constant is too short. Monostable multivibrator 138 receives the output M of multivibrator 136 which occurs with a 0.9 millisecond period, and consequently monostable multivibrator 138 is held on producing a negative going output waveform N. Since waveform N is down and waveform O is up, NAND gate 146 will be operated to produce a low going output R during the period when surface 176 is scanned. This output is discontinued at point 171 inasmuch as a reflection from sources 156 and 158 will no longer be received by detector 150. Substantially no output is produced for the wane area 170, except for waveform P.

However, at level 169, the radiation from sources 152 and 154 will reach detector 150 causing an AC waveform 196 corresponding to the surface level 172. As a result of saturation in amplifier 130, a pulsed output 198 is produced at L having a period of 0.5 milliseconds corresponding to the flashing period of sources 152 and 154. The 0.5 millisecond period signal causes both monostable multivibrators 136 and 140 to produce continuous outputs at M and O. Since a continuous output is produced at M, monostable multivibrator 138 is not operated to supply an output N, i.e., its output level rises. Therefore, NAND gate 142 will be operated and will provide a negative going output Q on lead 188 so long as surface 172 is scanned.

When point 167 is reached, no output will be produced for the period of scanning of wane 174, except for output P. However, at point 173 at the beginning of surface 178, sources 156 and 158 will provide radiation detected by detector 150, causing a negative going waveform R in a manner similar to that discussed with respect to surface 176. At point 183, this output discontinues as wane 182 is scanned. When point 187 is reached at the edge of the member, radiation from source 148 again reaches detector 150, and Schmitt trigger circuit 132 is operated resulting in discontinuance of waveform P.

As in the previous embodiment, it will be observed the waveforms P, Q and R are useful for detecting the various dimensions and levels of the composite member, and may be used for operating a computer or saw control if desired.

Although only two levels of wood thickness are illustrated as detected according to the apparatus of FIGS. 12-14, it will be understood the apparatus can be expanded to detect further levels if so desired. Also, the multiple level member 162 is illustrated for purpose of explanation only, and it will be understood the apparatus would normally be used for detecting levels of substantially separate cants.

Although infrared radiation and detection is preferred according to the scanner of the present invention, clearly other forms of radiation may be employed. Thus, the radiation sources and the detector may be operated at the wavelength of visible light if desired, and providing the illumination level of the surroundings isn't too high.

Furthermore, the differentiation between radiation beams is herein described as accomplished through the pulsing of said beams, and discrimination is made in the electronic circuitry through the detection of pulse length. However, it is clear other methods of differentiation may be employed. Thus, different wavelengths of radiation can be utilized and separately detected as to frequency, or the radiation sources can be energized separately and sequentially, with synchronous detection being provided in the electronic circuitry.

While I have shown and described plural embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. A scanner for detecting the position and lateral extent of the acceptable wood surface of a cant as distinguished from the wane at the edge of said cant, comprising:
   a first source of electromagnetic radiation for positioning on a first side of said cant adjacent the wane thereof,
   a detector of electromagnetic radiation aligned with said source and positioned on the opposite side of said cant from said source,
   means for producing relative movement between said cant and the combination of said first source and said detector such that said cant essentially moves between said first source and said detector for interrupting the radiation received from said first source by said detector as the edge of said cant passes therebetween,
   and at least one second source of electromagnetic radiation positioned on the same side of said cant as said detector and the wane of said cant for directing radiation toward the acceptable wood surface of said cant at an angle relative to said surface and intersecting said surface for producing detection of radiation from said second source by said detector only when said surface has the correct level.

2. A scanner according to claim 1 including a pair of said second sources for directing electromagnetic radiation at two angular directions toward a plane of intersection for producing detectable radiation in alignment with said detector when said surface has the correct level.

3. The scanner according to claim 2 wherein said pair of second sources are located substantially in a plane with said detector and wherein said plane is aligned with the direction of relative movement between said cant and the combination of said source and said detector, one of said pair of second sources being positioned forward of said detector in said plane, and the other of said second sources being positioned rearward of said detector in said plane.

4. The scanner according to claim 1 including means for pulsing said second source and means coupled to said detector for producing a predetermined output only so long as said detector receives pulsed radiation from said source as reflected by said acceptable wood surface.

5. The scanner according to claim 4 wherein said means coupled to said detector comprises first circuitry for producing a first output when said radiation from said first source is interrupted by said cant, and discriminating circuitry responsive to the pulse period of said second source for producing said predetermined output.

6. The scanner according to claim 1 including means for providing a difference in the character of radiation from one of said first and second sources as compared with the other, and means coupled to said detector for distinguishing between differing electrical signals produced from said detector in response to the difference in the character of radiation produced by said first and second sources, radiation as detected from said first source providing an output indicative of the presence of said cant and radiation as detected from said second source providing an output indicative of said correct level of said cant between wanes thereof.

7. The scanner according to claim 6 wherein said means for providing a difference in the character of radiation from one of said sources as compared with the other comprises means for pulsing one of said sources to supply pulsed radiation, and wherein said means coupled to said detector comprises pulse responsive means for distinguishing between a pulsed source and a non-pulsed source.

8. The scanner according to claim 7 wherein said means coupled to said detector comprises at least one monostable multivibrator having a time constant longer than the pulse period of the pulsed source and supplying an output as long as pulsed radiation is received by said detector.

9. The scanner according to claim 8 further including a trigger circuit responsive to the output of said detector when said detector receives non-pulsed radiation, said non-pulsed radiation being produced by said first source, and said pulsed radiation being produced by said second source.

10. The scanner according to claim 9 wherein said monostable multivibrator is AC coupled to receive the output of said detector.

11. The scanner according to claim 1 wherein said means for producing relative movement comprises a conveyor means, and further including hold down means for urging said cant toward said conveyor means.

12. The scanner according to claim 1 wherein said means for producing relative movement comprises conveyor means, and further including means for contacting the acceptable wood surface of said cant nearest said detector, said detector and said second source of radiation being positionable in response to said contacting means to remain at a predetermined level with respect to said acceptable wood surface.

13. The scanner according to claim 1 wherein said electromagnetic radiation comprises infrared radiation.

14. A scanner for detecting the position and lateral extent of the acceptable wood surface of a cant as distinguished from the wane at the edge of said cant, comprising:
- a first source of electromagnetic radiation for positioning on a first side of said cant adjacent the wane thereof,
- a detector of electromagnetic radiation aligned with said first source and positioned on the opposite side of said cant from said first source,
- means for producing relative movement between said cant and the combination of said first source and said detector such that said cant essentially moves between said first source and said detector for interrupting the radiation received from said first source by said detector as the edge of said cant passes therebetween,
- and a pair of second radiation sources positioned on the same side of said cant as said detector and the wane of said cant for directing radiation toward the acceptable wood surface of said cant, each of said second sources providing radiation at an angle relative to said surface and both intersecting a plane of said surface at a predetermined location to produce an illuminated point aligned with said detector for detection thereby so long as the plane of said surface has a predetermined level.

15. The scanner according to claim 14 wherein said second sources are located substantially in a plane including the detector, said plane extending in the direction of relative movement between said cant and the combination of said first source and said detector, with one of said second sources being located forward of said detector in the direction of relative movement for directing radiation angularly rearwardly toward said point aligned with said detector and the other of said second sources being located rearwardly of said detector in the direction of relative movement to provide radiation angularly forwardly toward said point aligned with said detector.

16. Wane detector apparatus comprising a plurality of scanners for detecting the position and lateral extent of acceptable wood surface of a cant as distinguished from the wane at the edge of said cant,
- each said scanner comprising a first source of electromagnetic radiation for positioning on a first side of said cant adjacent the wane thereof, a detector of electromagnetic radiation aligned with said source and positioned on the opposite side of said cant from said first source, and at least one second source of radiation positioned on the same side of said cant as said detector and the wane of said cant for directing radiation toward the acceptable wood surface of said cant between the wanes thereof at an angle relative to said surface and intersecting said surface for producing detection of radiation from said second source by said detector only when said surface has the correct level,
- including means for producing relative movement between said cant and said plurality of scanners, said scanners being arranged in array fashion for substantially simultaneously intercepting a forward wane of said cant as said cant is translated in a lateral direction, whereby said wane is detected along a plurality of scans across said cant corresponding to the respective scanners for ascertaining the extent of wane indentation of said cant.

17. A scanner for detecting the position and lateral extent of acceptable wood surfaces of cants as distinguished from the wane at the edges of said cants, comprising:
- a first source of electromagnetic radiation for positioning on a first side of said cant adjacent the wane thereof,
- a detector of electromagnetic radiation aligned with said source and positioned on the opposite side of said cant from said source,
- means for producing relative movement between a said cant and the combination of said first source and said detector such that said cant essentially moves between said first source and said detector for interrupting the radiation received from said first source by said detector as the edge of said cant passes therebetween,
- at least one second source of radiation positioned on the same side of a said cant as said detector and the wane of said cant for directing radiation toward the acceptable wood surface of said cant at an angle relative to said surface and intersecting said surface for producing detection of radiation from said second source by said detector only when said surface corresponds to a predetermined first level, and at least one third source of radiation positioned on the same side of said cant as said detector and the wane of said cant for directing radiation toward the acceptable wood surface of said cant at an angle relative to said surface and intersecting said surface for producing detection of radiation from said third source by said detector only when said surface corresponds to a predetermined second level different from said first level.

18. The scanner according to claim 17 wherein the radiation from said third source intersects the line of view of said detector at a point differing from the point of intersection of radiation from said second source with said line of view of said detector for distinguishing said first and second levels.

19. The scanner according to claim 18 including a pair of said second sources for directing electromagnetic radiation at two angular directions intersecting the line of view of said detector at said first level, and further including a pair of said third sources for directing electromagnetic radiation at two angular directions for intersecting the line of view of said detector at said second level.

20. The scanner according to claim 19 wherein said sources of radiation are located substantially in a common plane with said detector, said plane being substantially aligned with the direction of relative movement between said cant and the combination of said first source and said detector.

21. The scanner according to claim 17 including means for providing a difference characterizing the radiation provided by the first, second and third sources, and means coupled to said detector for distinguishing between electrical signals produced by said detector in response to differing characteristic radiation from said sources for indicating the presence of said cant and said first and second levels.

22. The scanner according to claim 21 wherein said means for providing a difference characterizing the radiation from said first, second and third sources comprises means for pulsing two of said sources at different frequencies, and wherein said means coupled to said detector for distinguishing between electrical signals comprises pulse rate responsive means.

23. The scanner according to claim 22 wherein said pulse rate responsive means comprises a first monostable multivibrator coupled to receive the output of said detector and having a time constant longer than the pulse period of radiation from either pulsed source, and a second monostable multivibrator having a time constant less than the pulse period of one of said pulsed sources but longer than the pulse period of the other pulsed source to produce a pulsed output when radiation is received by said detector from the said one of said pulsed sources but a constant output when radiation is received by said detector from the said other of said pulsed sources, and means for correlating the output of said first and second multivibrators.

24. The scanner according to claim 23 further including a trigger circuit responsive to the output of said detector for providing an output when a said cant moves between said first source and said detector for interrupting radiation received from said first source.

25. The scanner according to claim 24 wherein said first and second monostable multivibrators are AC coupled to receive the output of said detector.

26. The scanner according to claim 23 wherein said correlating means includes a third monostable multivibrator receiving the output of said second monostable multivibrator and having a time constant for producing an output only in the event the second monostable multivibrator supplies a pulsed input thereto, and gating means receiving the outputs of said second and third monostable multivibrators for producing differing outputs dependent upon whether one or both of said second and third monostable multivibrators produce an output.

27. The method of detecting the position and lateral extent of acceptable wood surface of a cant as distinguished from the wane at the edge of said cant, comprising:

producing a first beam of electromagnetic radiation and directing said first beam in a first direction along a first path, detecting said first beam of electromagnetic radiation at a location along said first path spaced from the point of production thereof, producing relative movement between a said cant and said first beam so that the said cant interrupts the first beam, directing at least one second beam of electromagnetic radiation angularly toward said cant from a position on the same side of said cant as the detection of said first beam so that reflected radiation from said acceptable wood surface can be detected, and detecting reflected radiation substantially only from a point on said acceptable wood surface as will be produced by said second beam when said acceptable wood surface is at a predetermined level.

28. The method according to claim 27 including directing an additional second beam angularly toward said cant to intersect said point on said acceptable wood surface when said acceptable wood surface is at a predetermined level.

29. The method according to claim 27 including changing the character of one of said beams with respect to the other and distinguishing between the detection of said beams in accordance with said character.

30. The method according to claim 29 including pulsing at least one of said beams to distinguish between said beams in the detection thereof.

31. The method according to claim 27 further including directing at least one third beam of electromagnetic radiation angularly toward said cant from a position on the same side of said cant as the detection of said first beam, and detecting the intersection of said third beam with said acceptable wood surface for a level different from said first mentioned predetermined level.

32. The method according to claim 27 wherein said electromagnetic radiation comprises infrared radiation.

* * * * *